(12) United States Patent
Despres et al.

(10) Patent No.: US 6,357,570 B1
(45) Date of Patent: Mar. 19, 2002

(54) FRICTION CLUTCH WITH WEAR TAKE-UP DEVICE FOR FRICTION LININGS, IN PARTICULAR FOR MOTOR VEHICLE, PROVIDED WITH MEANS INDICATING DEGREE OF SAID WEAR

(75) Inventors: Dominique Despres, Amiens; Olivier Doremus, Izel-lez-Hameau; Jean-Luc Travers, Andechy, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/582,873
(22) PCT Filed: Nov. 5, 1999
(86) PCT No.: PCT/FR99/02713
§ 371 Date: Jul. 6, 2000
§ 102(e) Date: Jul. 6, 2000
(87) PCT Pub. No.: WO00/28229
PCT Pub. Date: May 18, 2000

(30) Foreign Application Priority Data

Nov. 6, 1998 (FR) .............................. 98 14016

(51) Int. Cl.⁷ ............................................. F16D 13/75
(52) U.S. Cl. ................................ 192/70.25; 192/111 A
(58) Field of Search .......................... 192/70.25, 111 A, 192/89.23, 89.24

(56) References Cited

U.S. PATENT DOCUMENTS

| | | | |
|---|---|---|---|
| 3,982,614 A | | 9/1976 | Bisaillon |
| 4,474,274 A | | 10/1984 | Lutz et al. |
| 5,564,541 A | | 10/1996 | Gochenour et al. |
| 5,645,154 A | | 7/1997 | Weidinger |
| 5,690,203 A | | 11/1997 | Link et al. |
| 5,816,379 A | * | 10/1998 | De Briel et al. ......... 192/70.25 |
| 5,845,750 A | * | 12/1998 | De Briel et al. ......... 192/70.25 |
| 5,971,125 A | * | 10/1999 | Doremus et al. ........ 192/70.25 |
| 6,029,788 A | * | 2/2000 | Weidinger et al. ....... 192/70.25 |
| 6,152,274 A | * | 11/2000 | Blard et al. ............. 192/70.25 |
| 6,161,670 A | | 12/2000 | Doremus et al. |
| 6,176,360 B1 | * | 1/2001 | De Briel et al. ......... 192/70.25 |
| 6,193,039 B1 | * | 2/2001 | Doremus et al. ........ 192/70.25 |
| 6,202,815 B1 | | 3/2001 | Bacher et al. |

FOREIGN PATENT DOCUMENTS

| | | |
|---|---|---|
| DE | 4436109 | 1/1996 |
| FR | 2739159 | 3/1997 |
| FR | 2 765 286 | 12/1998 |
| GB | 2294301 | 4/1996 |
| GB | 2 294 301 A | 4/1996 |

* cited by examiner

Primary Examiner—Rodney H. Bonck
(74) Attorney, Agent, or Firm—Liniak, Berenato, Longacre & White

(57) ABSTRACT

The invention concerns a clutch friction, comprising a reaction plate (202) designed to be locked in rotation on an input shaft a friction disk (200), bearing at its external periphery at least one friction lining (201), designed to be locked in rotation on an output shaft, a pressure plate (1), a cover (2) fixed on the reaction plate (202), clutch means with axial action (3) controlled by releasing means and which operate between the cover (2) and the pressure plate (1) via support means (14), the pressure plate (1) being interlocked in rotation with the cover (2) while being capable of moving axially relative thereto and subjected to the action of elastic return means returning the pressure plate (1) axially towards the cover (2). Said friction clutch further comprises a wear take-up device, one of the supports of the clutch means (3) being capable of being axially offset the wear take-up device further comprises means, called diverging means, adapted to modify rapidly, for a predetermined degree of wear of the friction lining (201), the position of the elements controlling the releasing means.

27 Claims, 10 Drawing Sheets

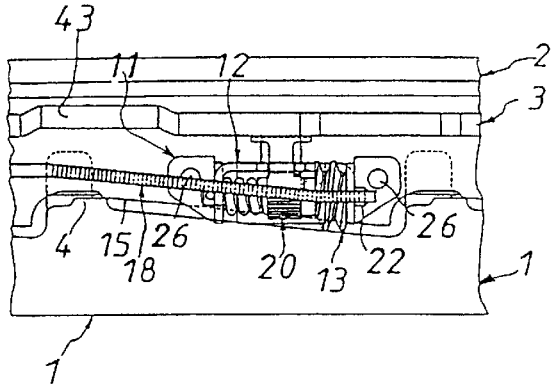
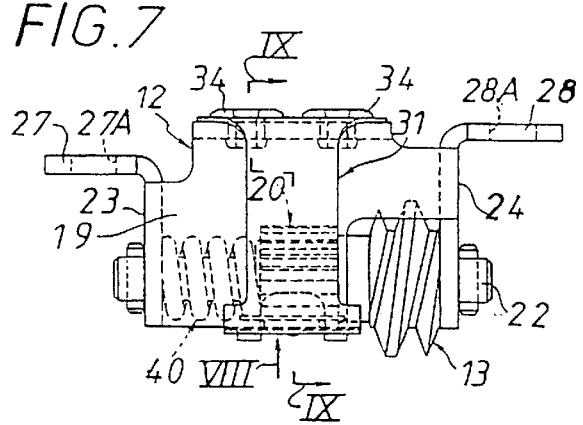
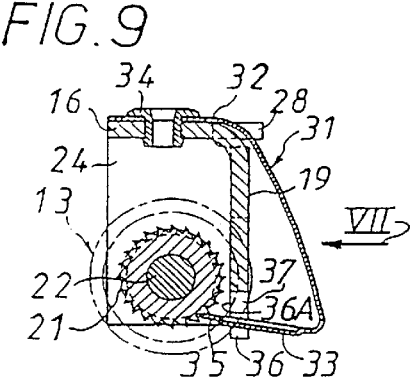
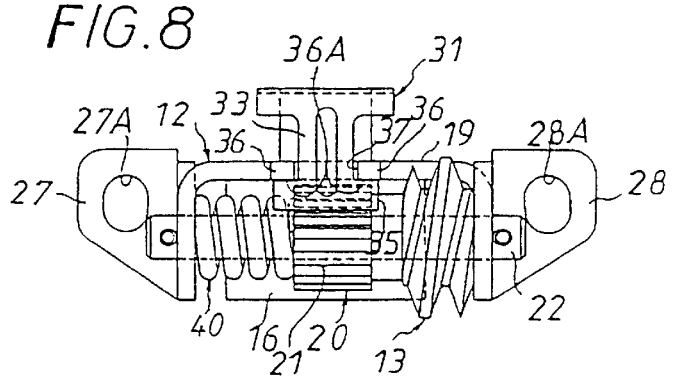

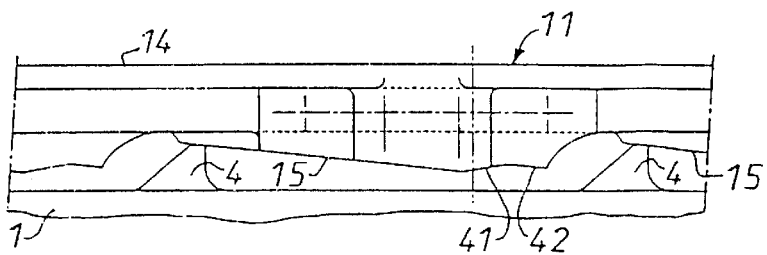
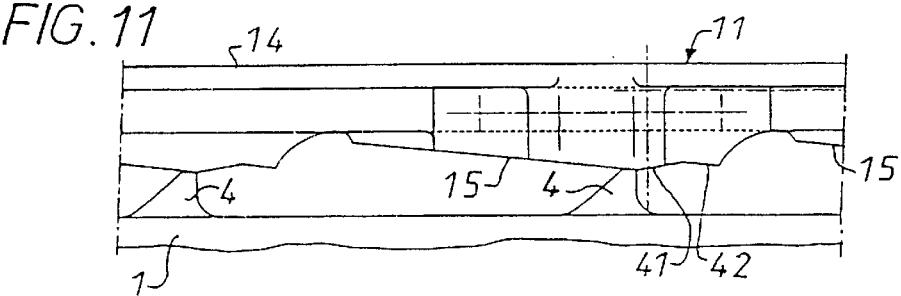
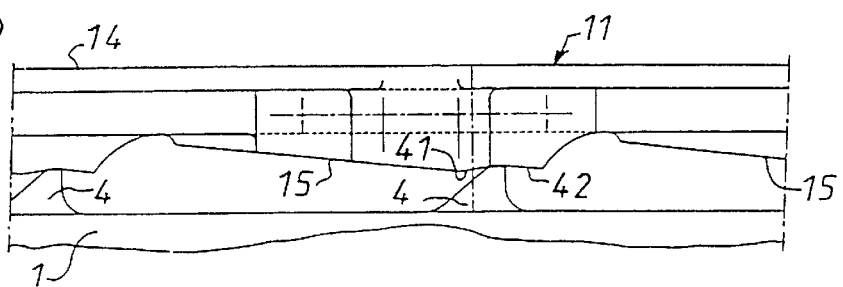
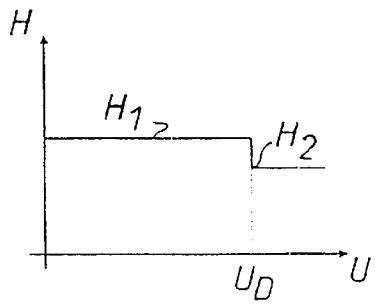
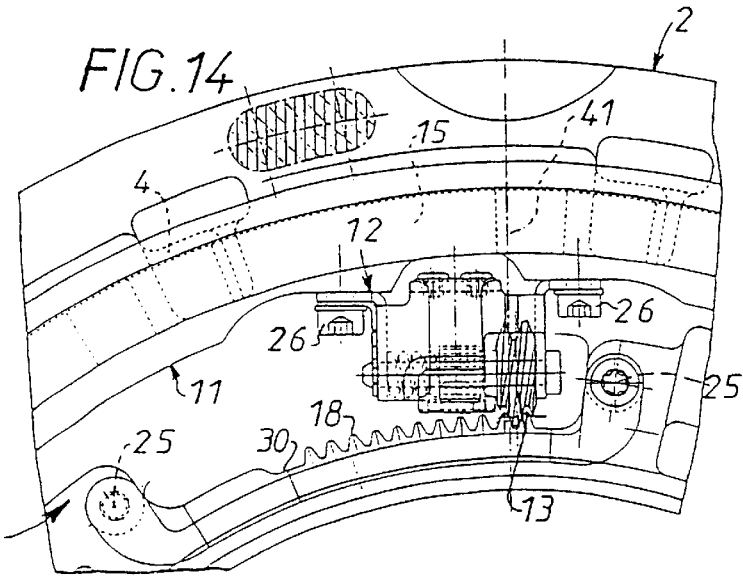

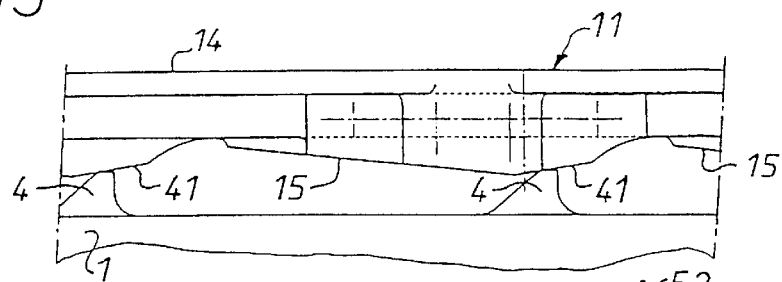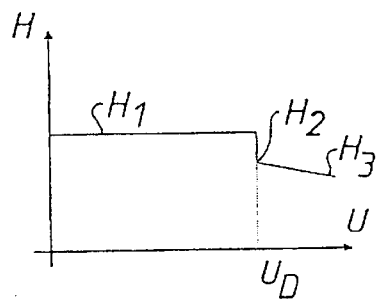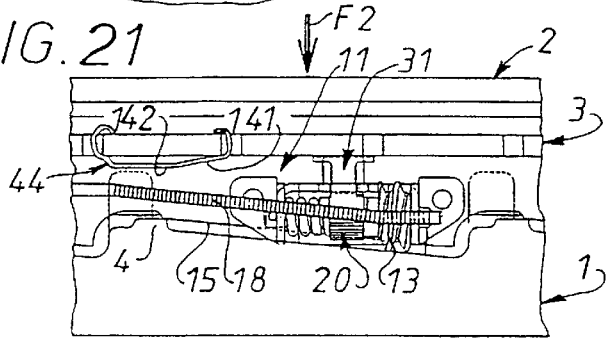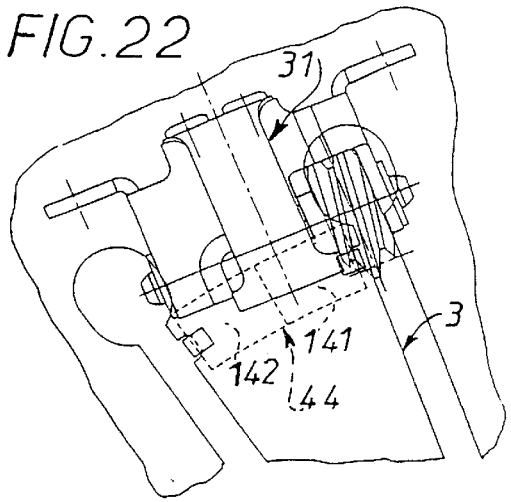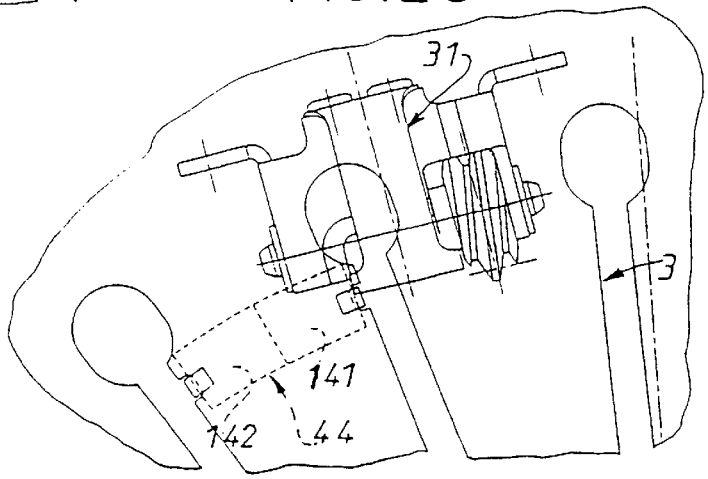

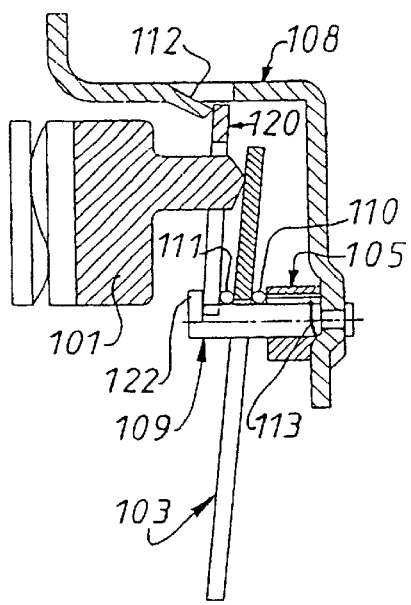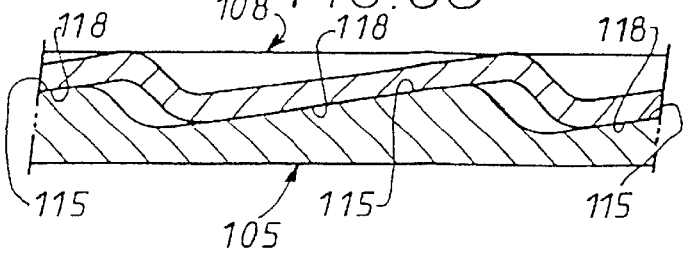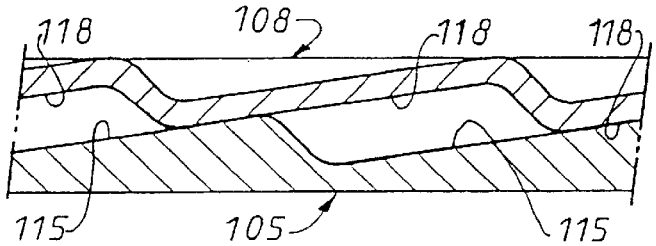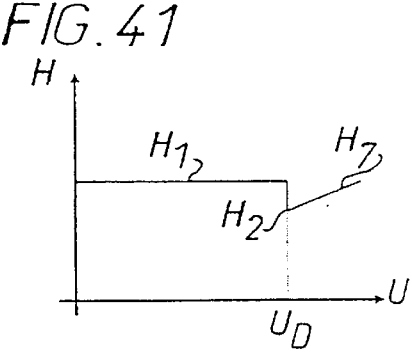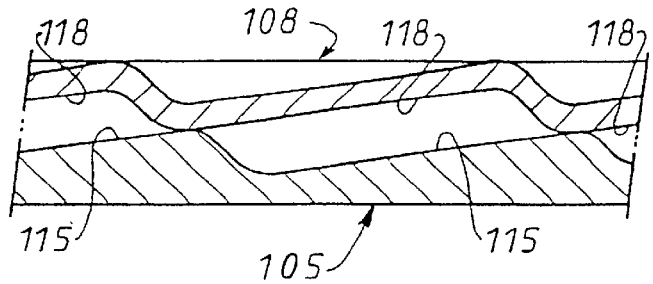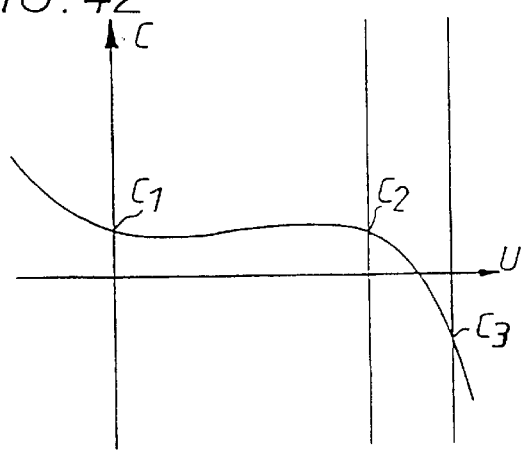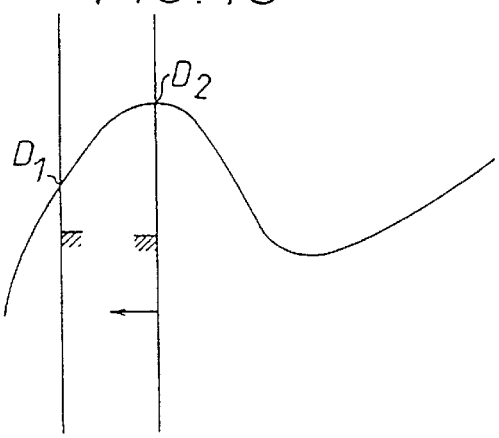

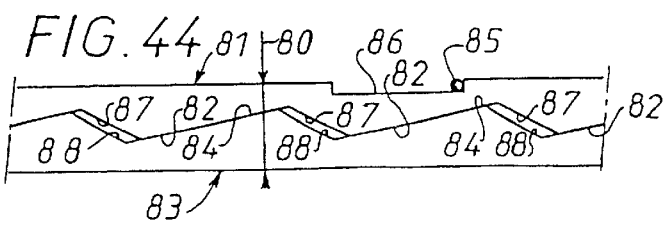
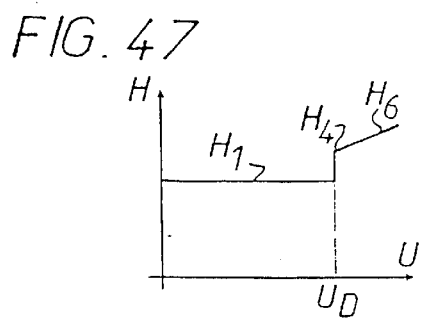
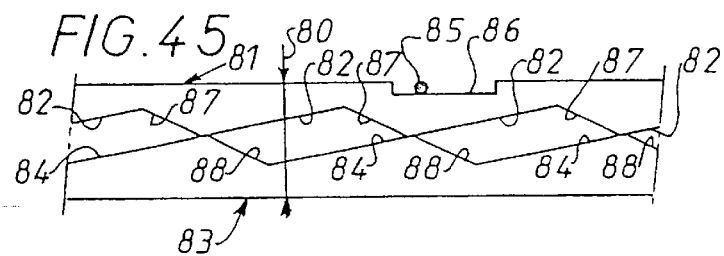
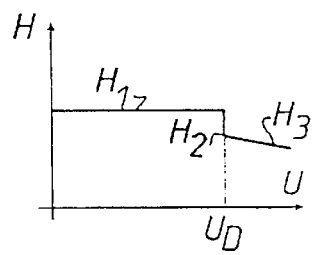
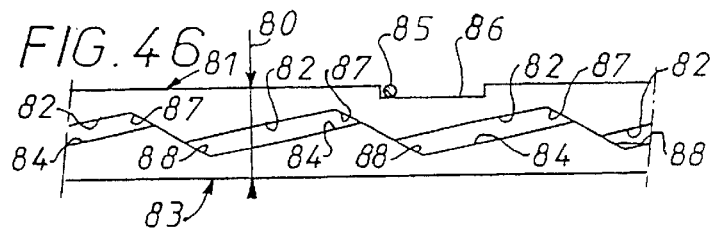
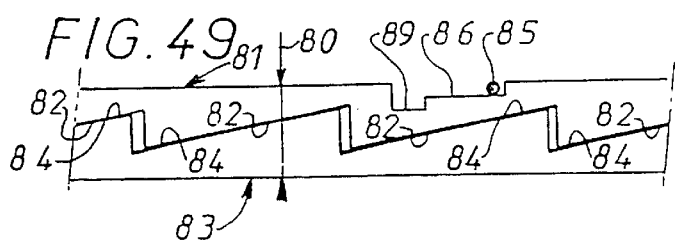
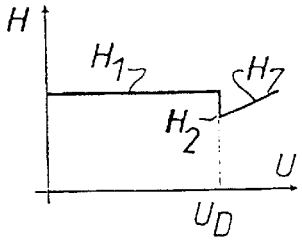
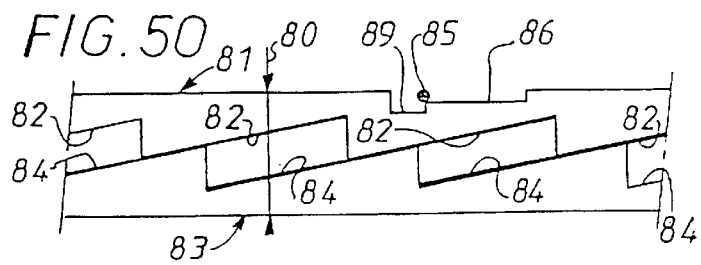
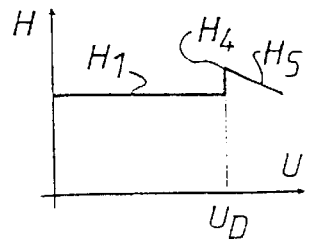
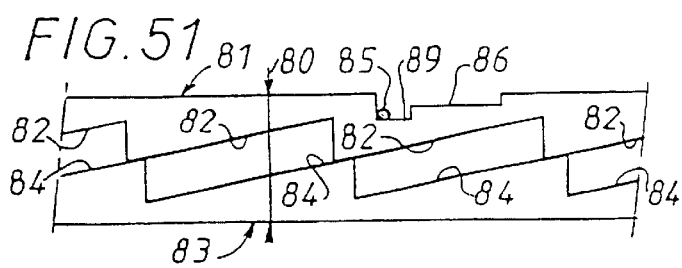

FRICTION CLUTCH WITH WEAR TAKE-UP DEVICE FOR FRICTION LININGS, IN PARTICULAR FOR MOTOR VEHICLE, PROVIDED WITH MEANS INDICATING DEGREE OF SAID WEAR

BACKGROUND OF THE INVENTION

1. Field of the Invention

The present invention relates to a friction clutch, in particular for a motor vehicle, and more particularly it relates to a clutch equipped with a device for compensating for wear, particularly in at least one friction liner, referred to hereinafter as a wear take-up device.

2. Description of Related Art

A conventional friction clutch generally includes a reaction plate, which may be in two parts so as to constitute a damping flywheel or a flexible flywheel, which is mounted in rotation on a first shaft, usually a driving shaft such as a crankshaft of the internal combustion engine, and which supports through its outer periphery a cover plate to which at least one pressure plate is attached.

The pressure plate is fixed with respect to the cover plate and reaction plate for rotation therewith, while being displaceable axially under the biasing action of axially acting resilient clutch engaging means controlled by declutching means; the clutch engaging means may consist of helical springs, or one or two Belleville rings mounted in series or in parallel and subjected to the action of declutching levers which constitute the declutching means; generally, the clutch engaging means and declutching means are part of the same component, for example a metallic diaphragm bearing on the cover plate; the diaphragm may be mounted in series or in parallel with a Belleville ring so as to assist the declutching force, in the manner described for example in the document FR-A-2 753 758.

A friction disc, carrying one or more friction liners at its outer periphery, and rotatable with a shaft, usually a driven shaft such as the input shaft of the gearbox, is interposed between the pressure plate and reaction plate so as to be gripped between them when the clutch is engaged. The clutch engaging means control the axial displacement of the pressure plate when actuated by a clutch release bearing through the declutching means.

In the course of the useful life of such a clutch, the friction liner or liners and the materials of the cooperating components, namely the pressure plate and reaction plate, become worn, which causes a variation in the position of the pressure plate and the positions of the axially acting clutch engagement means and clutch release bearing, as a result of which there is, firstly, a variation in the force with which the friction disc is gripped between the pressure plate and reaction plate due to the modifications in the working conditions of the clutch engaging means, and secondly, the force necessary to disengage the clutch is affected. By giving such a clutch a wear take-up device, these disadvantages are avoided since the clutch engaging means and the clutch release bearing, which is usually in constant engagement on the declutching means, occupy the same position when the clutch is engaged.

A friction clutch equipped with a wear take-up device is arranged in such a way that one of the abutments of the clutch engaging means, whether the abutment is coupled directly or indirectly to the cover plate or whether the abutment is coupled directly or indirectly to the pressure plate, is displaceable axially, and a so-called compensating means is provided for performing this displacement in association with a so-called actuating means which starts, and in fact actuates, the said compensating means, and a triggering means which itself controls the actuating means by authorising or not authorising the starting of the actuating means. A wear take-up device is of course governed by a so-called detection means which is responsive to wear in the liner or liners, directly or indirectly, that is to say it is for example responsive to the position of at least one of the components of the clutch influenced by the said wear, with the said detection means acting on one of the said means consisting of the compensating means, actuating means and triggering means.

Various types of wear take-up device are known.

For example, document FR-A-2 753 503 describes a clutch in which the wear take-up device comprises ramp means disposed circumferentially and constituting the compensating means, being placed axially between the displaceable abutment and the pressure plate and being adapted to be driven in rotation by a set of teeth which they carry at their periphery and with which a tangentially disposed worm cooperates, means being provided for driving the worm in rotation and being rendered operational by wear in the friction liner or liners, together with non-return means that prevent the worm from rotating in the opposite direction from that in which it is driven in rotation by the rotational driving means when these are operational, the worm, the non-return means and the rotational driving means for the worm being carried by a support which is fixed to the cover plate, and the axially acting resilient clutch engaging means consisting of a diaphragm. The means for driving the worm in rotation are controlled by the diaphragm; the ramp means consist of an annular ring which has the displaceable abutment for the diaphragm and ramps which are inclined and spaced apart circumferentially, while the pressure plate has pads or ramps which are adapted to cooperate with the ramps of the ramp means; the worm is mounted for sliding movement on its axis, being subjected to the action of a so-called wear take-up resilient means constituting the actuating means, and when it is displaced on its axis, it drives the said ramp means in circumferential rotation. The means for driving the worm in rotation consist of a ratchet wheel fixed to the worm, and the non-return means consist of a pawl that cooperates with the ratchet wheel. In this case the detecting means is a tongue which is actuated by the diaphragm and adapted to cooperate with the ratchet wheel, with its course of travel increasing with wear until, with the clutch engaged, it can push on one tooth of the ratchet wheel and so cause the worm to turn, thereby compressing the elastic wear take-up means; the triggering means is represented by a reduction in the load on the band of the elastic wear compensating means on which engagement takes place during the declutching operation, when its load is sufficiently high to overcome the friction forces, thereby enabling the inclined ramps to be displaced and therefore enabling the plate abutment to be displaced axially.

Thus, the detection means, in this case the tongue controlled by the diaphragm, acts via the ratchet wheel on the actuating means which here comprise the resilient wear take up means, thus causing an actuating force to appear; triggering takes place during a subsequent declutching operation.

In the document GB-A-2 294 983, the clutch engaging means consist of a diaphragm and the displaceable abutment is again the plate abutment; the compensating means again consists of the ramps; the actuating means is a spring which acts permanently between ramps and counter ramps in the direction of increase of the axial thickness; here again, the triggering action takes place during the declutching operation by reduction in the load on the band of engagement, while the pressure plate is displaced as a function of wear with respect to a pin in engagement on the reaction plate, with the said pin, which projects frictionally through the pressure plate, constituting the detection means. This pin carries an abutment in the form of a lever that cooperates with the ramp means; the detection means then acts on the compensating means.

In the document GB-A-2 294 301, the clutch engaging means once again consist of a diaphragm, the means for compensating by means of ramps and the spring actuating means acting permanently between the ramps and, in this case, the cover plate; in this case the displaceable abutment is the primary abutment carried by the cover plate; the clutch is of the push-to-release type, and triggering is obtained by lowering of the secondary abutment which is situated facing the primary abutment on the same side as the pressure plate and mounted elastically, while the maximum declutching load increases with wear and this constitutes- the detection means, the descent of which constitutes the triggering means. The detection means accordingly acts on the triggering means, and a clearance appears between the primary and secondary abutments as the secondary abutment descends, the said clearance being taken up by a movement of the primary abutment under the action of the actuating means.

In the document U.S. Pat. No. 5,564,541, in the version shown in FIG. 10, the detection means is a pin which is disposed with a clearance between the cover plate and the reaction plate and which extends frictionally through the pressure plate, the force necessary for displacement of the pin with respect to the pressure plate being greater than the return force of the pressure plate which in this case is due to the tangential tongues; the actuating means is a spring that acts permanently between the pressure plate and the ramps that constitute the compensating means; it is the plate abutment which is displaceable, the clutch as a whole being of the pull-to-release type. In this case the course of travel for disengaging the clutch varies: the fully declutched position is fixed in such a way that triggering takes place at the end of this declutching operation, after wear has been detected and a clearance has appeared, this clearance being subsequently filled under the action of the actuating means.

In the document FR-A-2 599 446, in the version in FIG. 5, the elements are analogous to those in the preceding document, except that the compensating means is a free wheel working in only one axial direction, and the actuating means is a spring which permanently biases the balls into engagement against their ramps.

In the version in FIG. 3 of the document U.S. Pat. No. 5,564,541, the detection means is a pin which is disposed with a clearance between the cover plate and the pressure plate and which extends frictionally through the cover plate, the force necessary for displacing the pin with respect to the cover plate being greater than the return force of the pressure plate, which in this case is due to the tangential tongues; the actuating means is a spring which acts between the cover plate and an annular rotary ring having ramps adapted to cooperate with counter ramps; it is therefore the cover plate abutment which is displaceable, the clutch being of the pull-to-release type. The triggering action takes place at the end of the declutching operation, after wear has been detected and a clearance has appeared, the clearance being taken up under the action of the actuating means; as in FIG. 10, the position of full declutching is fixed, the clutch engaging means comprising declutching levers associated with helical springs which bear on the cover plate.

When a clutch is equipped with a wear take-up device which operates automatically, it is relevant for the user to have some idea of the degree of wear in the friction liners; in this connection, without this information he runs the risk of using his friction disc until the friction liners are substantially worn out, and this situation can lead to serious damage to the friction surfaces of the flywheel and/or the pressure plate, which are expensive to replace; this is the case for example when, the friction liners of the friction disc being held in place by rivets, the latter start to rub against the pressure plate and to damage the friction surface of that plate.

It has in the past been proposed, for example in the document FR-A-2 496 204, to monitor the position of the friction disc which is displaced axially as a function of wear, for the information of the user; such an arrangement makes use of induction coils and requires space to be available in the centre and increases the axial size of the clutch.

Given that the control members for the clutch engaging means also shift as a function of wear, it has been proposed to measure this shift, especially in the documents U.S. Pat. No. 3,982,614 or FR-A-2 712 947; not only are solutions of this kind not simple, but above all they have the disadvantage that they cannot be applied to a clutch equipped with a wear take-up device.

In the French patent application filed on Jun. 17, 1998 under the No. 98 07639, the wear take-up device itself is made use of so as to inform the user of the state of wear in the friction liners; in this case, it includes circuit breaking means for putting it out of circuit before the liners are fully worn; as wear continues, the position of the diaphragm changes in the engaged state of the clutch, and therefore its load and the force needed for declutching increases, which warns the user that he has passed the maximum safe value of wear, for example 80%.

Such an arrangement operates well; it does however suppose that the user has some familiarity with the driving of his vehicle.

SUMMARY OF THE INVENTION

An object of the invention is to overcome these drawbacks, while also taking advantage of the wear take-up device itself, and more precisely its operation, for the purpose of warning the user of a certain degree of wear, by creating a sharp break in the progress of the wear take-up operation which is adapted to modify, rapidly and significantly, the position of the control members for the declutching means; thus, the user is very clearly warned, regardless of his state of familiarity.

Thus, according to the invention, a friction clutch, in particular for a motor vehicle, of the kind comprising a reaction plate designed to be mounted in rotation on a driving shaft, a friction disc carrying at its outer periphery at least one friction liner, adapted to be mounted in rotation on a driven shaft, a pressure plate, a cover plate fixed on the reaction plate, axially acting clutch engagement means which are controlled by declutching means and which act between, firstly, the cover plate and, secondly, the pressure plate through interposed abutment means, the pressure plate being fixed to the cover plate for rotation with the latter while being displaceable axially with respect to it and being subjected to the action of elastic return means biasing the pressure plate axially towards the cover plate, the said clutch also including a wear take-up device, one of the abutments of the clutch engaging means being displaceable axially and the wear take-up device including a compensating means actuated by an actuating means and arranged to effect the said displacement, the said actuating means being controlled by a triggering means in association with a detection means responsive to wear in the friction liner and acting on at least one of the actuating means, compensating means and triggering means, is characterised by the fact that the wear take-up device further includes so-called divergence means carried by one of the elements in the group consisting of the compensating means, actuating means, triggering means and detection means, adapted to modify rapidly, for a predetermined amount of wear in the friction liner, the position of the control members for the declutching means.

The change is felt by the user and/or can be detected in the control of the declutching means.

The predetermined amount of wear may be the total or substantially the total wear of the friction liner or liners. In one embodiment, the rapid change is an abrupt change.

Further features of the invention are defined in the dependent Claims at the end of the description.

BRIEF DESCRIPTION OF THE DRAWINGS

In order that the invention can be more clearly understood, some embodiments will now be described by way of purely illustrative and non-limiting example, these embodiments being shown in the attached drawings, in which:

FIG. 6 is a scrap view in the direction of the arrow VI in FIG. 1;

FIGS. 7 to 9 show the unitary sub-assembly consisting of the support, worm, ratchet wheel, spring, spindle, and resilient member; FIG. 7 is a view in the direction of the arrow VII in FIG. 9, which is a view in cross section on IX—IX in FIG. 7; FIG. 8 is a view in the direction of the arrow VIII in FIG. 7;

FIGS. 10 to 12 are scrap views seen from the side, showing the arrangement of the ramp means in the clutch of FIGS. 1 to 9, and their cooperation with the pads of the pressure plate; in FIG. 10, the clutch is in its new state, FIG. 11 shows the end of first-level wear take-up, and FIG. 12 shows the end of the detection phase and the beginning of second-level wear take-up;

FIG. 13 shows the development of the height of the clutch during wear;

FIGS. 14 and 15 are similar to FIGS. 1 and 10 and correspond to another version, with the clutch in its new state;

FIGS. 16 and 17, and FIGS. 18 and 19, are similar to FIGS. 14 and 15, and show the clutch, respectively, at the end of the wear take-up operation in FIGS. 16 and 17, and in a phase with no wear take-up in FIGS. 18 and 19;

FIG. 20 shows the development of the height of the clutch of FIGS. 14 to 19, during wear;

FIG. 21 is similar to FIG. 6 and shows a modified divergence means;

FIG. 22 is a view in the direction of the arrow F2 in FIG. 21, showing the resilient member cooperating with the detection ramp in the detection phase;

FIG. 23 is similar to FIG. 22 and corresponds to the end of the wear take-up phase;

FIG. 37 is similar to FIG. 30 and shows a modified clutch;

FIGS. 38 to 43 are similar to FIGS. 31 to 36 respectively and relate to the clutch of FIG. 37;

FIGS. 44 to 46 show another version of the invention applied to a clutch equipped with ramp means and counter-ramps, these means being shown, respectively, in the position which they occupy when new in FIG. 44, at the end of the wear take-up phase in FIG. 45, and in the detection phase in FIG. 46;

FIGS. 47 and 48 show the development of the height of a clutch equipped with the means of FIGS. 44 to 46, the clutch being of the push-to-release type, FIG. 47, or the pull-to-release type, FIG. 48;

FIGS. 49 to 53 are similar to FIGS. 44 to 48 respectively, and correspond to a further version;

DESCRIPTION OF THE PREFERRED EMBODIMENTS

Figure 1:
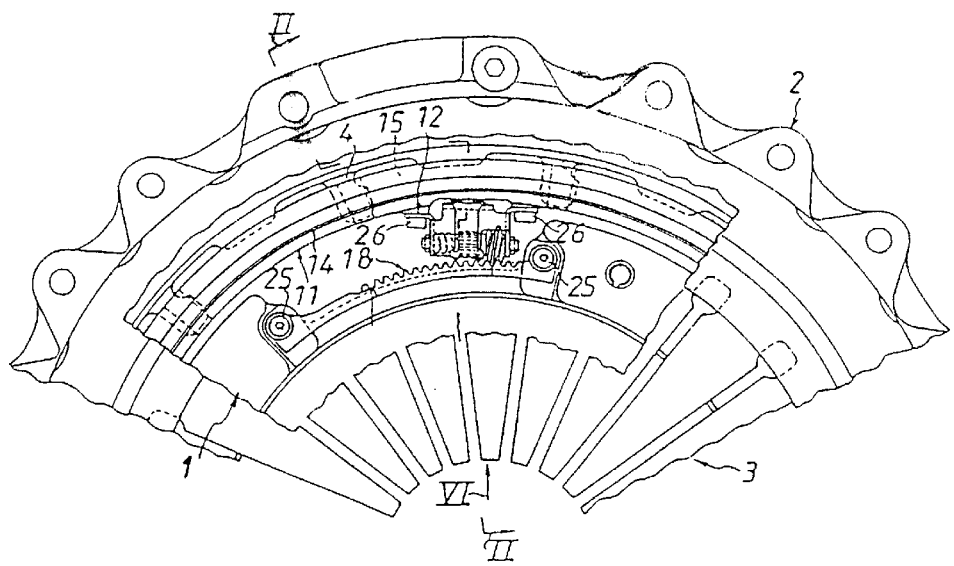
FIG. 1 is a top plan view, shown partly cut away, of part 4 clutch equipped with a wear compensating device according too the invention, when the liners are new.

In FIGS. 1 to 27 the diaphragm clutch 3 has a hollow cover plate 2.

The cover plate in this example is a metal pressing.

The cover plate has a base and means for fastening it on a reaction plate, which may be of divided form, to constitute a damping flywheel or a flexible flywheel as can be seen for example in the document GB-A-2 294 301, to which reference should be made for more detail.

In the embodiments in FIGS. 1 to 27, the means for fastening the cover plate consist of an axially oriented annular skirt which is an extension of a radial flange having holes for passage of the fastening members, such as screws, which secure the cover plate 2 to the reaction plate.

In another version, the cover plate is generally in the form of a hollow dish and has at its outer periphery a radial flange constituting means for fastening the cover plate to the reaction plate, the said flange being provided with holes for passage of fastening members such as screws for securing the cover plate to the reaction plate.

In the embodiments of FIGS. 1 to 27, the clutch is of the pull-to-release type, so that it is necessary to exert a tractive force on the inner ends of the fingers of the diaphragm 3 so as to disengage (declutch) the clutch. The peripheral outer portion of the Belleville ring of the diaphragm bears on the base of the cover plate, on a thrust ring, not given a reference numeral, which is carried by the outer periphery of the base of the cover plate, or, in another version, on a press-formed element formed in the said base. The inner peripheral portion of the said Belleville ring is in contact with a so-called tertiary abutment 14, to be described later herein.

In the embodiment in FIGS. 28 to 57, the clutch is of the push-to-release type, that is to say it is necessary to exert a thrust with the aid of a clutch release bearing, not shown, on the inner ends of the fingers of the diaphragm 103, so as to disengage (declutch) the clutch. For this purpose, the base of the cover plate 108 carries, firstly, a primary abutment consisting for example of a press-formed element formed in the base of the cover plate at the inner periphery of the latter, and secondly, facing the primary abutment, a secondary abutment in the form of the heads of short posts, or a rolled crown carried by short posts, or any other means.. The diaphragm 103, through the inner periphery of its Belleville ring, is mounted for tilting between the said primary and secondary abutments. It is in contact through the outer periphery of its Belleville ring with abutment zones to be described below and constituting the tertiary abutment.

Figure 2:
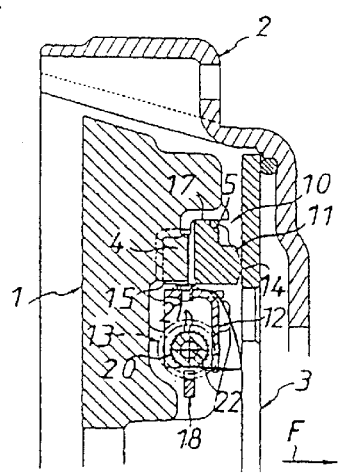
FIG. 2 is a scrap view of the clutch, in cross section on II—II in FIG. 1.
Figure 3:
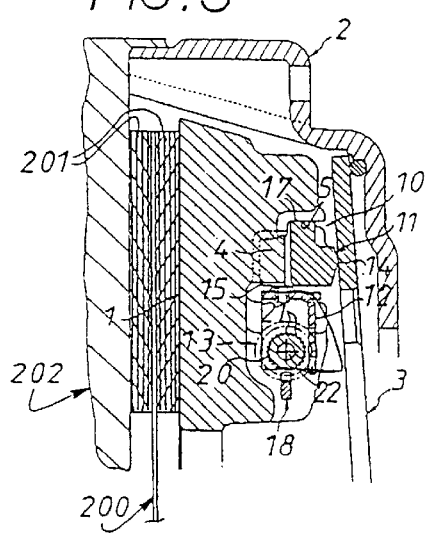
FIG. 3 is a view similar to FIG. 2 when the clutch is disengaged.

With reference to FIGS. 1 to 10, these show a friction clutch mechanism, especially for a motor vehicle, which comprises a pressure plate 1 adapted to cooperate with a friction disc 200 which carries at its outer periphery friction liners 201, and which itself cooperates with a reaction plate 202; for reasons of simplification, the friction disc 200, the friction liners 201 and the reaction plate 202 are shown in outline only in FIG. 3. The reaction plate 202 is arranged to be mounted in rotation on a driving shaft such as the crankshaft of the internal combustion engine. The friction disc 200 is fixed in rotation to a driven shaft such as the input shaft of the gearbox. More precisely, the liners 201 are fixed to a support which is rigidly or flexibly coupled to a hub which is mounted in rotation on the input shaft and which constitutes the output element of the friction disc 200; in the region of the friction liners 201, the support is preferably elastic in the axial direction as described for example in the document GB-A-2 294 301, so as to constitute a progressive friction disc. In another version, the friction disc is not progressive. For example, the support may be embedded within a friction liner.

In all cases the friction disc has two friction faces for disengageably cooperating with the pressure plate 1 and reaction plate 202 respectively.

The pressure plate 1 is fixed in rotation to a cover plate 202 through interposed tangential tongues, not shown in the drawings, which are elastic and which at the same time constitute means for returning the pressure plate 1 towards the cover plate 2, the latter being in this example a metal pressing.

The pressure plate 1, while being fixed in rotation to the cover plate 2, is accordingly displaceable axially with respect to the cover plate 2 under the biasing action of controlled axially acting resilient means, which in this case consist of a diaphragm 3 bearing on the cover plate 2 through its outer periphery, the clutch being here of the pull-to-release type with operation of the clutch being effected by acting on the ends of the fingers of the diaphragm 3 in the direction of the arrow F in FIG. 2.

In order, when the clutch is engaged, to hold the axially acting resilient means 3 in a position independent of wear of the liner or liners of the friction disc, and to a lesser extent wear in the pressure plate 1 and reaction plate, the so-called friction faces of which undergo wear in contact with the liner or liners of the disc, a wear take-up device 10 is provided.

The wear compensating device 10 comprises ramp means 11 which are disposed circumferentially; more precisely, these ramp means 11 consist of an annular ring on which ramps 15 are disposed circumferentially; the said ring also has abutment means 14 consisting of an upper edge which is rounded or, in another version, chamfered, and which is centred on the axis of the clutch, this edge being located axially towards the outside with respect to the ramps 15.

The pressure plate 1 has pads 4 which in this example are formed by moulding and machining, on its face that faces towards the base of the cover plate 2, these pads being spaced apart circumferentially at a distance from each other that corresponds to the distance which circumferentially separates two successive ramps 15, with each pad 4 being arranged to cooperate with a ramp 15.

The ramp means 11 are located axially between the diaphragm 3 and the pressure plate 1, so that the pads 4 receive the ramps 15, and the diaphragm 3 cooperates with the abutment zones 14 which thus constitute the abutment means through which the diaphragm 3 acts on the pressure plate 1.

The ramp means 11 have at their outer periphery a cylindrical wall 17 parallel to the axis of the clutch and cooperating with a cylindrical, coaxial recess 5 formed on the pressure plate on its surface that faces towards the base of the cover plate 2, so that the ramp means 11 are centred with respect to the pressure plate 1. The ramp means 11 constitute a compensating means, as will be described below.

The wear take-up device 10 further includes a ratchet wheel 20 with inclined teeth 21, which is carried by a spindle 22 that also carries a worm 13.

The spindle 22 of the ratchet wheel 20 is carried by a support 12, which can be seen best in FIGS. 7 to 9 and which in this example is of sheet metal press-formed and bent, or which, in another version, is of moulded material, being U-shaped with a spine portion 19 and two wing portions 23, 24 adapted to support the spindle 22; for this purpose, each of the wing portions has a circular hole which is matched to the diameter of the spindle 22.

The wing portions 23, 24 of the support 12 are extended by arms 27, 28 in an L shape, which are spaced apart from each other at right angles to the spine portion 19.

The support 12 is adapted to receive a resilient member 31 which in this example is of metal and which is generally C-shaped, having an end portion 32 which is used for fastening, in this case by means of rivets 34, the resilient member 31 on a return 16 of the spine portion 19 of the support 12, this return 16 extending in this example at right angles to the spine portion 19 and in alignment with the arm 28. The other end portion 33, which is T-shaped, of the resilient member 31 carries a terminal control tongue 35.

When the resilient member 31 and the ratchet wheel 20 are mounted on the support 12, the control tongue 35 cooperates with a tooth root of the ratchet wheel 20; a helical compression spring 40 is placed between the ratchet wheel 20 and the wing portion 23 of the support 12, being wound around the spindle 22; the worm 13 and the ratchet wheel 20 are in one piece with each other; as can be seen, the support 12 equipped with this component and with the resilient member 31, spring 40 and spindle 22, together constitutes a subassembly ready to be fitted.

The helical spring 40 constitutes the resilient take-up means which constitutes an actuating means in the manner to be described below.

The thread and pitch of the worm 13 are matched to a set of teeth 18; the worm 13 is arranged to cooperate with the teeth 18 under conditions which will be described below.

The set of teeth 18, which is best seen in FIGS. 1 and 6, is carried by a member bent from sheet metal into a generally flattened Z shape, and fixed through its ends, FIG. 1, on bosses of the pressure plate 1 by means of screws 25; these ends are disposed transversely with respect to the axis of the clutch, while the inclined portion that joins them together is parallel to the ramps 15.

The support 12, carrying the ratchet wheel 20, the worm 13 and the helical spring 40, being fixed to the ramp means 11, for example by means of screws 26, the threaded portion of which passes through passes 27A, 28A formed respectively in the arms 27, 28, the diaphragm 3 is displaced with respect to it during the operations of declutching and reclutching; it will be understood that, with this arrangement, during tilting of the diaphragm 3 in operations of reengaging the clutch, the latter displaces the control tongue 35 which, by cooperation with the teeth 21 of the ratchet wheel 20, is caused to rotate the ratchet wheel 20 clockwise; on the return movement, the elasticity of the resilient member 31 and the inclination of the teeth 21 causes the control tongue 35 to be displaced towards the right with respect to FIGS. 2 to 5, riding up on the teeth 21. As a function of wear in the liners 201, the inclination of the diaphragm 3 varies so that the control tongue 35 associated with the diaphragm 3 constitutes a detection means which is sensitive to the state of wear in the friction liners 201.

The wear compensating device just described operates as follows.

FIG. 2 shows the clutch engaged, with the liners of the friction disc being new and gripped between the reaction plate, not shown, and the pressure plate 1. In this position the end of the control tongue 35 is at the root of one tooth of the ratchet wheel 20.

When the clutch is disengaged, the diaphragm 3 tilts, and during this displacement it progressively releases the control tongue 35, the end of which moves along the inclined ramp defined by the tooth at the root of which it was located in the previous step; the end of the control tongue 35 is positioned with relation to the teeth 21 of the ratchet wheel 20 in such a way that, during this declutching operation with new liners, it does not jump over a tooth, as can be seen in FIG. 3; this is achieved by the end portion 33 of the resilient member 31 coming into abutment against the support 12, and more precisely against the faces 36A that face towards the ratchet wheel 20 of the flanks 36 of a slot 37 formed in the spine portion 19 of the support 12, these faces constituting a control abutment and limiting the course of return travel of the control tongue 35 regardless of that of the diaphragm 3, as is shown in FIG. 9, the end portion 33 being in the form of a T, the upright part of which is displaced into the slot 37 while its cross piece constitutes the control tongue 35.

Figure 4:
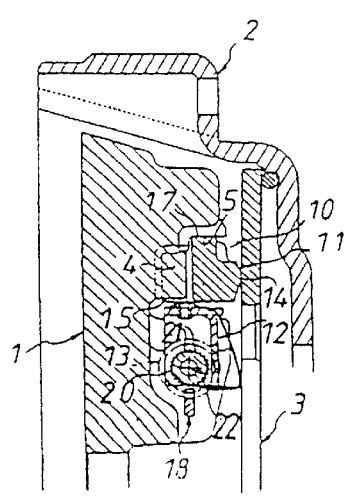
FIGS. 4 and 5 are views similar to FIGS. 2 and 3 respectively, after the liners have become worn.
Figure 5:
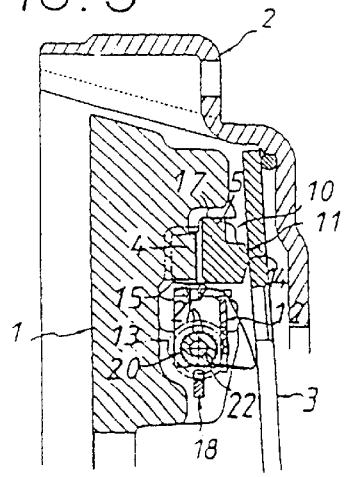

As the liners become worn, and in the known way, the pressure plate 1, which is always subjected to the axial force of the diaphragm 3, is displaced towards the reaction plate which is fixed axially, as is the cover plate 2; the diaphragm 3 therefore approaches the reaction plate, that is to say the open end of the cover plate 2, carrying with it the control tongue 35; the ratchet wheel 20 rotates clockwise about its axis; with the clutch engaged and the liners worn, this is shown in FIG. 4. This driving of the ratchet wheel 20 in rotation leads the worm 13 also to rotate on its axis; because the ramp means 11 are immobilised with respect to the cover plate 2 under the effect of the load exerted by the diaphragm 3, the worm 13, meshing with the set of teeth 18, exerts a kind of screw action on the set of teeth 18, slightly compressing the helical spring 40, the direction of the thread of the worm 13 being determined accordingly.

During the declutching operation that follows the wearing phase just described, the pressure plate 1 releases the liners, moving further away from the latter under the action of the tangential tongues, which return the pressure plate 1 and the ramp means 11 towards the base of the cover plate 2, the ramp means being in contact with the diaphragm 3 through their abutment zones 14 and with the pads 4 of the pressure plate 1 through their ramps 15, the end of the tongue jumping over the tooth, The helical spring 40 biases the worm 13 towards the wing portion 24 of the support 12, from which it became separated during the wearing phase, that is to say from left to right with respect to FIGS. 7 and 8; because the diaphragm 3 no longer exerts a force on the ramp means 11, the only force to be overcome in order to enable the ramp means 11 to rotate with respect to the pressure plate 1 is the friction force generated by the return force of the tangential tongues; if the force of the helical spring 40 is enough to overcome this force, the spring 40 then bearing on the worm 13 through, in this example, the ratchet wheel 20, then the worm 13, bearing on the set of teeth 18, rotates the support 12 and therefore the ramps 15: by rotating on themselves, the ramps 15 of the ramp means 11, by cooperating with the pads 4 of the pressure plate 1, will displace the pressure plate 1 further from the base of the cover plate 2, thus increasing the axial distance between the working surface of the pressure plate 1 and the abutment zones 14 of the ramp means 11, and thereby taking up at least partly the displacement of the pressure plate 1 due to wear in the liners. Because the load of the helical spring 40 is a function of the amount by which it will have been compressed by the worm 30 during the wearing phases, it can be seen that several clutch engaging and disengaging operations may be necessary before the wear compensating device 10 enters a take-up phase proper, this being a function of the relative dimensioning of the components; by way of example, the latter may be made in such a way that the take-up phase proper only happens for the first time after a certain amount of wear has taken place; in FIG. 5, which applies to the case where the clutch is disengaged with worn liners, it is supposed that no wear has been taken up; it is also supposed that the amount of wear has been enough for the ratchet wheel 20 to have rotated sufficiently far for the control tongue 35 to have jumped over one tooth on the return.

Thus, it is during the clutch engaging operation that the control tongue 35, pushed by the diaphragm 3, rotates the ratchet wheel 20 which compresses the spring 40, and during the subsequent declutching operation the ramp means 11, which are not gripped by the diaphragm 3, turn under the action of the actuating means which in this example consist of the spring 40, if its load is sufficient, and so compensate for the displacement of the plate due to wear; at the end of the take-up operation, the diaphragm 3, the ratchet wheel 20 and the control tongue 35 revert to the position that they occupied in FIG. 2.

In accordance with the invention, the clutch is equipped with a wear take-up device which includes divergence means adapted to modify rapidly, after a predetermined amount of wear has occurred, the position of the control members of the declutching means. The predetermined amount of wear may be the total wear, or substantially total wear, in the friction liners.

In this example, the divergence means abruptly modify the position of the members that control the declutching means before the friction liners have become fully worn. These divergence means consist, see FIG. 10, of a so-called detection ramp 41 which simulates an amount of wear and which follows each ramp 15 of the ramp means 11; the detection ramp 41 is inclined in the opposite direction from the associated ramp 1 5, and is itself followed by a so-called second-level ramp 42 which is inclined in the same direction as the ramp 15, in this case parallel to the ramp 15, the latter being referred to for convenience as the first-level ramp 15.

In the new state, the pads 4 of the pressure plate 1 cooperate with the first-level ramps 15 on the left hand portion of the latter in FIG. 10; in the course of wear and as described above, the first-level ramps 15 climb on the pads, on their right-hand portion with respect to FIGS. 10 and 11, the length of the first-level ramps 15 corresponding to the value of the predetermined amount of wear to be detected, for example 80 per cent of the total amount of wear; during this first-level take-up phase, the height of the mechanism, which is shown for example by the axial distance separating the ends of the fingers of the diaphragm 3 from the friction face of the reaction plate 202, remains constant as explained above; this height is the height H represented in FIG. 13, in which $U_D$ is the value of the wear to be detected.

As the wearing process continues, the pads 4 of the pressure plate 1 then cooperate with the detection ramp 41; because of its reverse slope in relation to the first-level ramps 15, a high degree of wear is thus simulated and the diaphragm 3 inclines in one direction so that the ends of its fingers approach the reaction plate 202, with a rapidity and suddenness which is greater as the angle of inclination of the detection ramps 41 is greater with respect to a transverse plane at right angles to the axis of the clutch; the new height of the clutch is then the height $H_2$, FIG. 13, which is smaller than $H_1$; at the end of the detection phase, the pads 4 occupy the position shown in FIG. 12; after this, in cooperation with the second-level ramps 42, a new wear take-up process takes place, the starting point of which is shown in FIG. 12 and which maintains the diaphragm 3 in its new position closer to the reaction plate 202; since the diaphragm 3 is caused to displace the resilient member 31, it is necessary that, for the second-level wear take-up phase, the relative positions of the diaphragm and of the said resilient members 31 should be identical to those which they occupied during the first take-up phase; to this end, a press-formed element 43, FIG. 6, which is directed axially towards the base of the cover plate 2 and which is therefore open towards the reaction plate 202, is formed on at least one of the fingers of the diaphragm 3; the depth of this element 43 is proportional to the difference between the heights $H_1$ and $H_2$ corrected by the ratio of the radii; when the pads 4 engage the second level ramp 42, FIG. 12, the resilient member 31 is in alignment with the press-formed element 43 so that it then enters the element 43, which corresponds to the new stabilising height $H_2$.

As will have been understood, the substantial change in the position of the declutching means during the wear detecting phase $U_D$ greatly modifies the position of control of the clutch, and the user will sense this modification very markedly. What occurs is a downward adjustment in which the height of the clutch changes from the height $H_1$ to the height $H_2$, the height $H_2$ being smaller than the height $H_1$.

The change is sensed by the user and/or is detectable in the control of the declutching means, in any appropriate way.

FIGS. 14 and 20 show another version in which the divergence means are similar to those described with reference to FIGS. 1 to 13, except that here, no second level wear take-up is provided.

Figure 15:
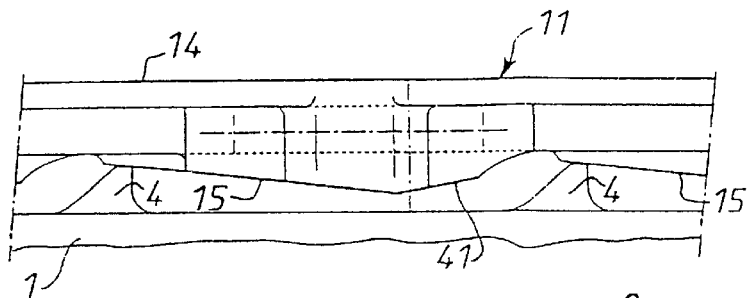

More precisely, in the new state, the relevant components of the clutch occupy the position shown in FIGS. 14 and 15, in which the pads 4 of the pressure plate 1 cooperate with the initial left hand part of the ramps 15 of the ramp means 11, FIG. 15; when wear has been taken up, the pads 4 move along the ramps 15 and the clutch has a constant height $H_1$, FIG. 20. In this example, in the manner described in the French patent application previously cited, the length of the set of teeth 18 with which the worm 13 cooperates enables the latter to take up only an amount of wear which generally corresponds to about one tooth, for example the predetermined amount of wear $U_D$ which it is desired to detect.

Figure 16:
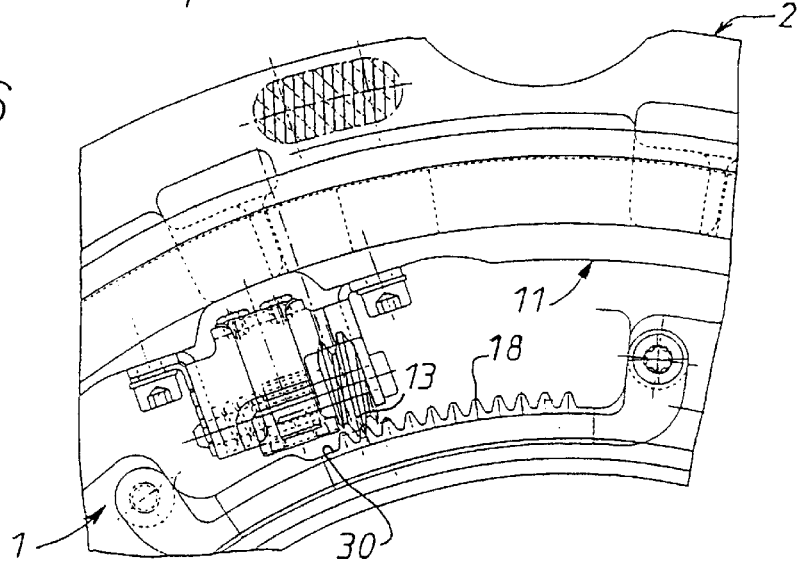
Figure 17:
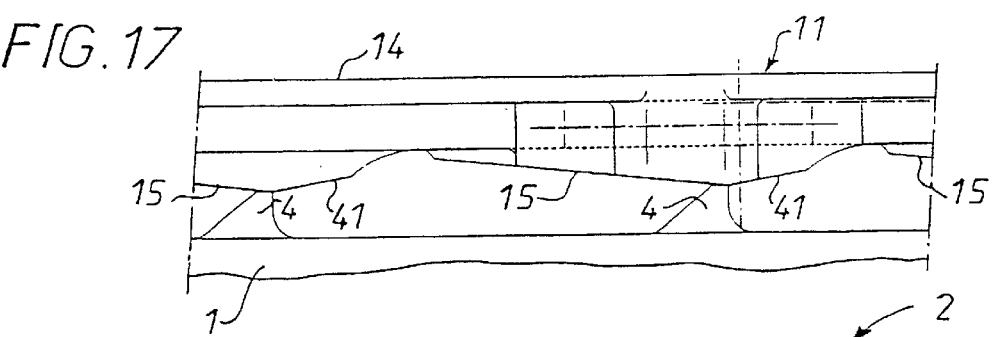

At the end of the wear take-up operation, the relevant components of the clutch occupy the position shown in FIGS. 16 and 17; the detection ramp 41 is then brought into use very rapidly, the diaphragm 3 is displaced into a wear position and the height of the clutch becomes $H_2$, FIG. 20, which is less that $H_1$ as before, indicating to the user that-wear has reached the amount $U_D$.

Figure 18:
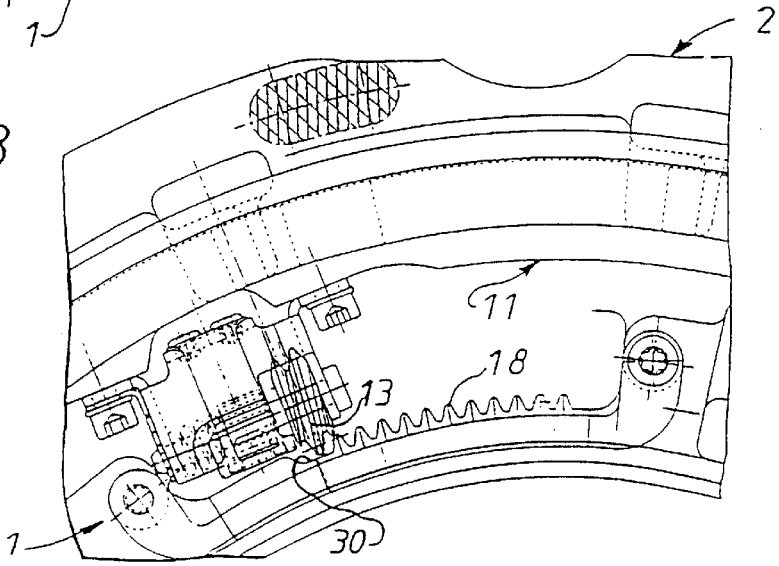

Finally, at the end of the set of teeth, a recess 30 which can be seen in FIGS. 14, 16 and 18 enables the worm 13 to disengage at this it 20 position from the set of teeth 18, FIGS. 18 and 19, so that the worm 13 no longer acts on the teeth 18, the clutch operates like a clutch which is not equipped with a wear compensating device, and its height develops in accordance with the curve $H_3$ in FIG. 20, with the ends of the fingers of the diaphragm 3 moving closer to the reaction plate 202 as a function of wear.

In FIGS. 1 to 20, a downward adjustment is thus effected due to the detection ramps 41 simulating wear.

The rapidity of this downward adjustment depends on the angle of inclination of the ramps. The greater this inclination is, the more severe is the effect. With a gentler slope, the effect is still rapid but less abrupt.

Because of the recess 30, more than 80% of the wear can take place in combination with the detection ramps.

In general terms, in FIGS. 1 to 20, the predetermined wear may be substantially the total amount of wear in the friction liners. The downward adjustment leads to modification of the declutching force and also to modification of the position of the ends of the fingers of the diaphragm. This may be detected by means of a force and/or position sensor.

For example, the clutch release bearing which is here arranged to act in a pulling mode on the fingers of the diaphragm for disengaging the clutch, may be equipped with a force and/or position sensor.

The position of the abutment zones may also be detected.

Thanks to these sensors it is possible to activate warning means such as a lamp, a voltmeter, an ammeter or the like, located on the fascia.

These arrangements can be applied when the information as to the degree of wear is obtained through an upward adjustment, in the manner described below.

Thus, in accordance with the version in FIGS. 21 to 24, the detection ramp 141 and the second level wear take-up ramp 142 are carried by the diaphragm 3, the resilient member 31 being adapted to cooperate with them as wear takes place; in this example, these ramps consist of a metal stirrup piece 44 which is suitably bent and clipped on one of the fingers of the diaphragm 3; as previously stated, the detection ramp 141 has an inclination opposite to that of the ramps 15, and develops towards the pressure plate 1, the second level take-up ramp 42 extending transversely with respect to the axis of the clutch.

Figure 24:
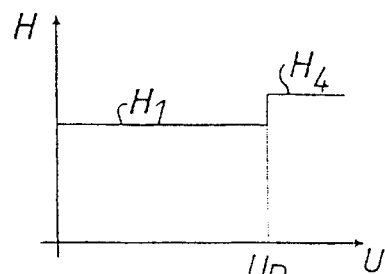
FIG. 24 shows the development of the height of the clutch in FIGS. 21 to 23, during wear.

Thus, the detection ramp 141 carries out to some extent an upwardly adjusting wear take-up phase in which the height of the clutch changes from a height $H_1$ to a height $H_4$ greater than $H_1$ as is shown in FIG. 24.

FIG. 22 shows the resilient member 31 cooperating with the detection ramp 141 in the detection phase; FIG. 23, similar to FIG. 22, shows the end of the second level wear take-up phase.

Figure 25:
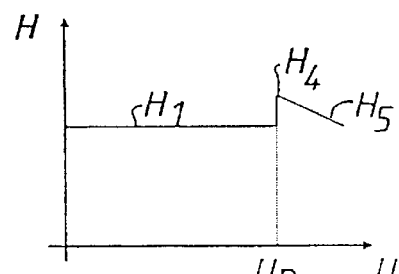
FIG. 25 is similar to FIG. 24, and shows the development of the height of a modified version of the clutch in FIGS. 21 to 23.

Here again, the second level take-up ramp 142 may of course be omitted, as in the version in FIGS. 14 to 20, and a recess 30 may be provided at the end of the set of teeth 18; thereafter, after the amount of wear $U_D$ has been detected, there is no further take-up and the height of the clutch varies in accordance with $H_5$, FIG. 25.

Figure 26:
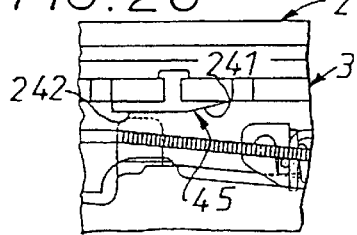
FIGS. 26 and 27 are partial views similar to FIG. 21, each showing a modified embodiment of the detection ramps and second-level wear take-up.
Figure 27:
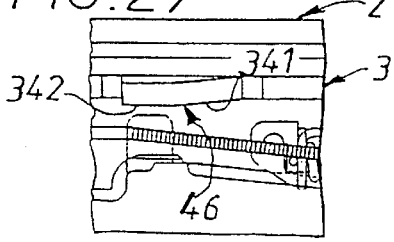

FIGS. 26 and 27 each show an embodiment of the detection and second level ramps; in FIG. 26, they are formed respectively at 241 and 242 on the outer face of the head of a rivet 45 which is riveted on one finger of the diaphragm 3; in FIG. 27 it is a finger 46 of the diaphragm 3 that is press-formed so as to have a detection ramp 341 and a second level ramp 342 respectively.

FIGS. 28 to 33 show part of a clutch of the same type as that described in FIGS. 15 to 17 of the document GB-A-2 294 301, to which reference should be made for more detail; let us simply recapitulate that, here again, the clutch means consist of a diaphragm 103 which is articulated with respect to the cover plate, the clutch being of the push-to-release type; here, this articulation includes a primary abutment 110 on the cover plate side and a secondary abutment 111 on the same side as the pressure plate 101, situated in facing relationship with the primary abutment 110, the primary abutment 110 and secondary abutment 111 being carried by short posts 109 which are spaced apart circumferentially and which are fixed to the cover plate 108; in this example, the disengageable abutment is the primary abutment 110, and triggering is obtained by lowering the secondary abutment 111 which is in cooperating engagement with a resilient so-called triggering means 121 that is itself in engagement on the cover plate 108.

Figure 28:
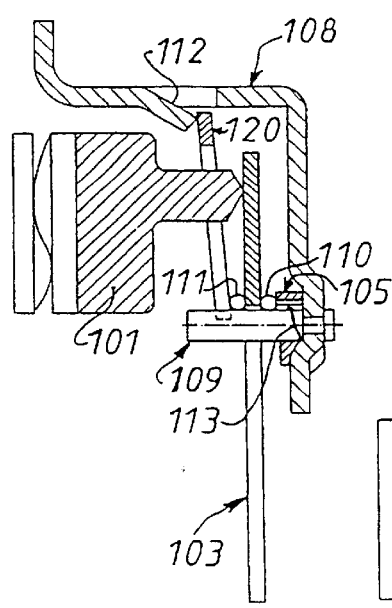
FIG. 28 is a diagrammatic view showing part of a clutch of the push-to-release type equipped with divergence means in accordance with the invention, the clutch being here in its new state.
Figure 30:
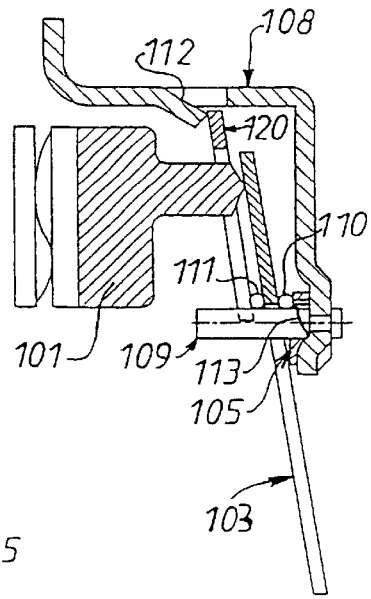
FIGS. 29 and 30 are similar to FIG. 28, and show the same clutch just before detection of a predetermined amount of wear, FIG. 29, and after detection of the same wear in FIG. 30.

In FIGS. 28 and 30, the resilient triggering means 120, which in this case is in the form of a diaphragm, also acts as a detection means; it is in engagement on the cover plate 108 through one or more lugs 112 projecting from the cylindrical skirt of the cover plate 108 and extending radially into the interior of the latter; while wear take-up operations are taking place, the abutments 110 and 111 are displaced towards the reaction plate and the resilient detecting means 120 is progressively tilted.

Figure 31:
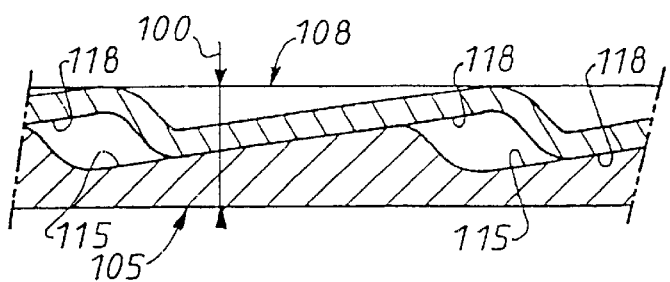
FIGS. 31 to 33 show on a large scale the relative positions occupied by the ramp means and counter-ramps of the clutch in FIGS. 28, 29 and 30 respectively.
Figure 32:
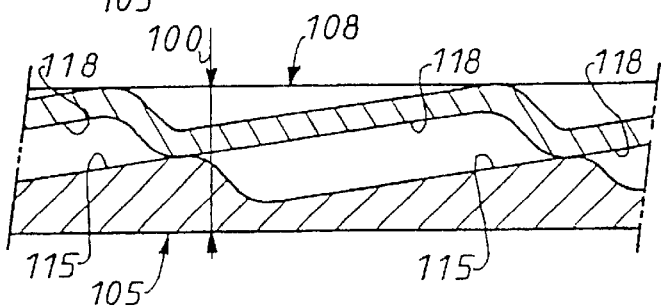
Figure 33:
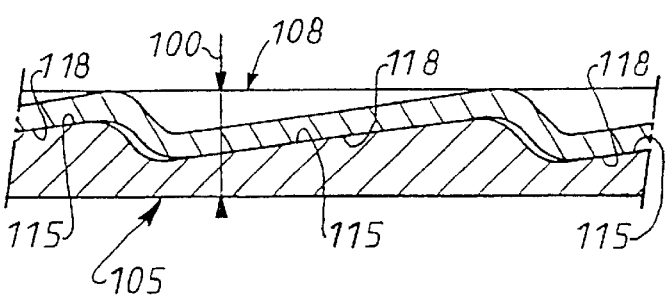

In this case the ramp means consist of resilient rings 105 surrounding the short posts 109 and located axially between the base of the cover plate 108 and the primary abutment 110; the transverse face of the rings 105 located facing the base of the cover plate 108 carries ramps 115 which can be seen in FIGS. 31 to 33 on a larger scale, and which cooperate with counter-ramps 118 formed in the base of the cover plate 108, in this example by deformation of the latter; a spiral spring 113 biases the rings 105 in rotation with respect to the cover plate 108 in the sense in which the primary abutment 110 is displaced axially away from the base of the cover plate 108.

Figure 35:
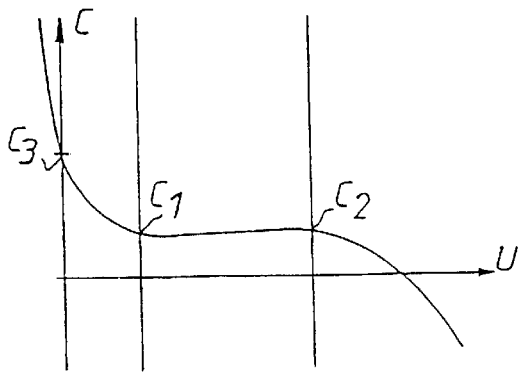
FIGS. 35 and 36 show the load curves for the detection spring and the diaphragm, respectively, in the clutch of FIGS. 28 to 34.
Figure 36:
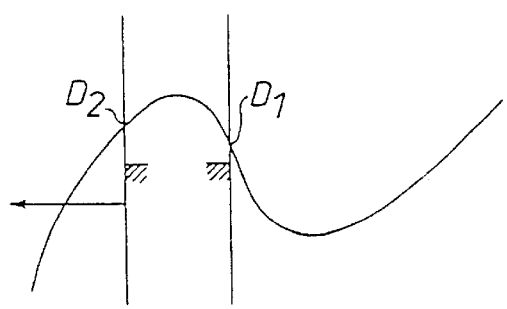

FIG. 35 shows the load characteristic of the detection means 120 as a function of its deformation and therefore as a function of wear; FIG. 36 shows the same characteristic for the diaphragm 103.

FIGS. 28 and 31 show the position of the components of the clutch when new; in this position, it will be noticed that the ramps 115 are partly offset with respect to the counter-ramps 118, so that the axial distance 100, FIG. 31, which represents the distance from the primary abutment 110 to the cover plate 108, is greater than the same distance when measured, see FIG. 33, when the ramps 115 and the counter-ramps 118 are in exact register with each other.

In the new state, the operating points of the detection means 120 and the diaphragm 103 are the points $C_1$ and $D_1$ respectively in FIGS. 35 and 36, the load at $C_1$ being greater than that at $D_1$.

In the course of the wearing process, the detection means 120 is deformed and its operating point moves from $C_1$ to $C_2$ on its chosen load curve, FIG. 35, so that during this change there is little variation in its load; having regard to the presence of the wear take-up device, the operating point of the diaphragm remains as $D_1$, FIG. 36.

Figure 29:
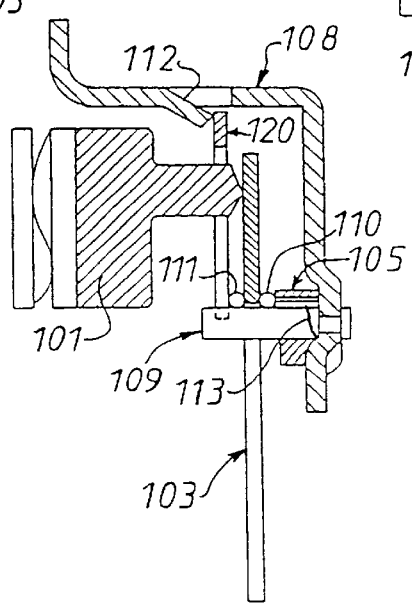
Figure 34:
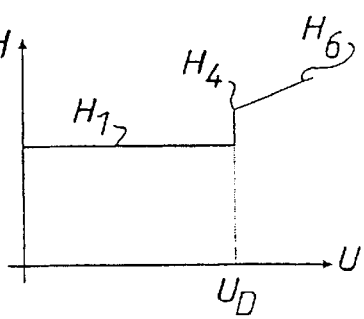
FIG. 34 shows the development of the height of the clutch in FIGS. 28 to 33 as a function of wear.

In the vicinity of the predetermined wear $U_D$ to be detected, and therefore just before the detection phase proper, the components of the clutch occupy the position shown in FIGS. 29 and 32; up to this stage, the height H of the clutch has the value $H_1$, FIG. 34, which is substantially constant, that is to say it is subject to the variation in the axial distance 100 mentioned above.

As wear proceeds, the ramps 115 jump sharply over the counter-ramps 118, and the axial distance 100, FIG. 33, becomes a minimum: the detection means 120 and the diaphragm 103 tilt significantly, FIG. 30, and the height of the clutch becomes $H_4$, FIG. 32, which is greater than $H_1$; in this position, the operating points of the detection means 120 and diaphragm 103 are $E_3$ and $D_2$ respectively, FIGS. 35 and 36; the load curves are so chosen that the load $C_3$ is greater than the load $D_2$, so that the secondary abutment 111 is not displaceable; the wear take-up device no longer operates, and as wear proceeds, the height of the clutch increases in accordance with $H_6$, FIG. 34. An upward adjustment therefore takes place.

FIGS. 37 to 43 show another version of the clutch which has been described with reference to FIGS. 28 to 36.

Here, the course of the travel of the detection means 120 is limited by an end stop 122 carried by at least one short post 109 in line with the primary abutment 110 and secondary abutment 111, on the same side as the pressure plate 101.

The chosen load curves are shown in FIGS. 42 and 43, which relate respectively to the detection means 120 and to the action of the diaphragm 103 on the secondary abutment during its actuation by the end stop.

In the new state and in the worn state just before detection, the detection means 120 and the diaphragm 103 occupy positions identical to those shown in FIGS. 28 and 29 respectively of the previous version, the inner periphery of the detection means 120 being spaced apart axially from the end stop 122, the load of $C_1$ to $C_2$ being greater than that at $D_1$, the operating point of the diaphragm; in these two states, new and at the threshold of the wear take-up phase, the ramp means occupy the positions shown in FIGS. 38 and 39.

As FIG. 42 shows, beyond the point $C_2$, the load of the detection means 120 decreases very rapidly; wear continues, the load C of the detection means 120 becoming smaller than $D_1$ and, rapidly and abruptly, the abutment 111 descends until the inner periphery of the detection means 120 comes into contact with the end stop 122.

Following this descent, which corresponds to a downward adjustment, the operating point of the diaphragm 103 passes from $D_1$ to $D_2$, FIG. 43; in parallel with this, the height of the clutch, which up to this point was the substantial constant amount $H_1$, becomes $H_2$ smaller than $H_1$, see FIG. 41; after detection, the ramps 115 occupy the position shown in FIG. 40.

After detection, the wear take-up device no longer operates: the height of the clutch then varies in accordance with $H_7$, FIG. 41.

FIGS. 44 to 48 show the application of the invention to a wear takeup device of the kind described in the document GB-A-2 294 983: the clutch engaging means are a diaphragm and the displaceable abutment is the plate abutment; the compensating means consist of ramps 82 carried by ramp means 81 and adapted to cooperate with counter ramps 84 carried by counter ramp means 83; the ramp means 81 and counter ramp means 83 are conventionally biased in circumferential relative displacement of one with respect to the other by means of a helical spring which constitutes the actuating means for the wear take-up device, in the sense of increasing the axial thickness 80 of the assembly which consists of the ramp means and counter ramp means; the pressure plate is displaced as a function of wear with respect to a pin which is in engagement on the reaction plate and which carries an abutment 85 cooperating with the ramp means 81, by virtue of a lateral slot 86 of the latter in which the said abutment 85 is caused to undergo relative displacement.

The relative position of the ramp means 81 and the counter ramp means 82 in the new state is shown in FIGS. 44, in which it can be seen that the abutment 85 is in line with one edge of the slot 86, in this case the right hand edge in the Figure.

As wear takes place, the ramps 82 of the ramp means 81 climb on the ramps 84 of the counter ramp means 83, with the axial thickness 80 increasing to a maximum as shown in FIG. 45, which corresponds to the wear $U_D$ to be detected; because of the wear compensating device, during this take-up phase, the diaphragm keeps its position and the height $H_1$ of the clutch, FIG. 47, stays constant; in this position the slot 86 is displaced with respect to the abutment 85, and the latter is spaced away from the edge of the slot 86 which is on the left in FIG. 45.

Following a subsequent short period of wear, the ramps 82 of the ramp means 81 jump over the ramps 84 of the counter ramp means 83; the ramps 82, 84 of the said means 81, 83 are separated by ramp tails 87, 88 respectively, which are inclined in the opposite direction from the latter; because of this arrangement, after the above mentioned jump between the ramps 82 and 84, the ramp tails 87, 88 cooperate, and this cooperation leads to a reduction in the axial thickness 80; this reduction is stopped by the left hand edge of the slot 86 coming into engagement against the abutment 85; the slopes of the ramp tails 87, 88 and the length of the slot 86 are so chosen that in this position, see FIG. 46, the axial thickness 80 is greater after detection than that which corresponds to the new state as in FIG. 44; the diaphragm has thus rapidly, and in this case abruptly, tilted in a significant way. In another version, the reduction is stopped by any other means.

When these arrangements are applied to a clutch of the push-to-release type, the height of the clutch then assumes a value $H_4$, FIG. 47, which is greater than $H_1$; after detection, the wear compensating device no longer operates and this height increases according to $H_6$.

In the case of a clutch of the pull-to-release type, the detection of $U_D$ leads to a height $H_2$ smaller than $H_1$; it then decreases according to $H_3$, FIG. 48.

FIGS. 49 to 53 show a further version similar to that in FIGS. 44 to 48; in this case, the ramps 82, 84 are not separated by ramp tails, and arrangements are made to prevent ramps from jumping. The sharp variation in the axial thickness 80 after detection is obtained by means of a slot 89 formed in the recess 86 and extending from its left hand edge, FIGS. 49 to 51; FIG. 49 corresponds to the new state and FIG. 50 to the end of the wear take-up phase; and in FIG. 51, which corresponds to the detection of $U_D$, the axial thickness 80 has sharply increased as compared with that in FIG. 50.

FIGS. 52 and 53 show the development of the height of a clutch of the push-to-release type and a clutch of the pull-to-release type, respectively; they are similar to FIGS. 41 and 25 respectively.

Figure 54:
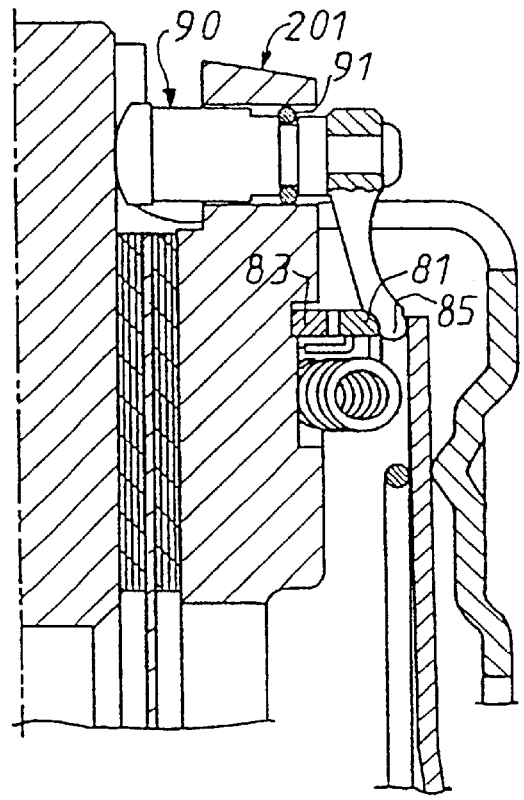
FIG. 54 is a view in cross section showing part of a clutch of the type described with reference to FIGS. 44 to 46, or 49 to 51, equipped with another version of divergence means according to the invention.

FIG. 54 shows in cross section part of a clutch of the same type as the preceding version in which, as stated above, a pin 90, in engagement on the reaction plate, extends frictionally through the pressure plate 201, to constitute the detection means of the wear compensating device, the said pin 90 carrying the abutment 85 which cooperates with the ramp means 81.

Figure 55:
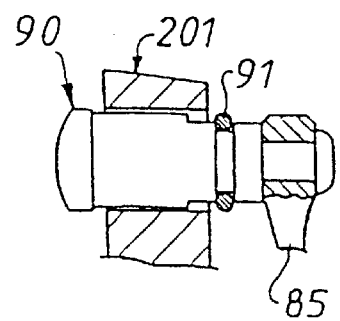
FIG. 55 is a view which partially repeats FIG. 54, and in which the divergence means are operational.
Figure 56:
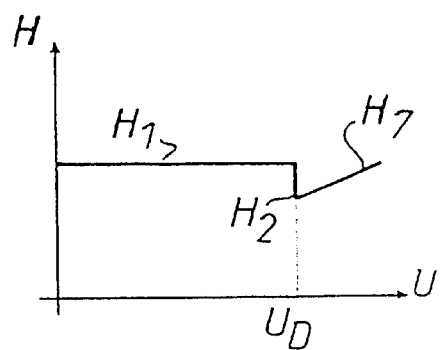
FIGS. 56 and 57 show the development of the height of the clutch equipped with the means according to FIGS. 54 and 55, the clutch being of the push-to-release type, FIG. 56, or the pull-to-release type, FIG. 57.
Figure 57:
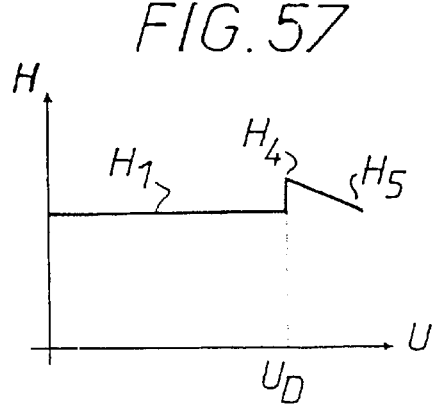

In this example, the frictional traverse of the pressure plate 201 is obtained by means of a radially elastic 0-ring 91 fitted in a groove formed on the pin 90; in accordance with the extent of wear, the pressure plate 201 is displaced with respect to the pin 90 up to the moment when the ring 91 leaves the pressure plate 201, FIG. 55; the pin 90 is then free, since it is no longer held by the pressure plate 201; the same is then true for the abutment 85 which no longer cooperates with the ramp means 81, and the latter are abruptly displaced, so increasing the axial thickness of the assembly which consists of the ramp means 81 and the counter ramp means 83; the result of these arrangements, illustrated in FIGS. 56 and 57, is identical to that which is obtained in the preceding version, so that FIGS. 56 and 57 are identical to FIGS. 52 and 53 respectively.

What is claimed is:

1. A friction clutch, comprising a reaction plate (202) designed to be mounted in rotation on a driving shaft, a friction disc (200) carrying at its outer periphery at least one friction liner (201), adapted to be mounted in rotation on a driven shaft, a pressure plate (1, 101), a cover plate (2, 108) fixed on the reaction plate (202), axially acting clutch engagement means (3, 103) which are controlled by declutching means and which act between, firstly, the cover plate (2, 108) and, secondly, the pressure plate (1, 101) through interposed abutment means (14), the pressure plate (1, 101) being fixed to the cover plate (2, 108) for rotation with the cover plate while being displaceable axially with respect to the cover plate and being subjected to the action of elastic return means biasing the pressure plate (1, 101) axially towards the cover plate (2, 108), said clutch also including a wear take-up device, one of the abutments of the clutch engaging means (3, 103) being displaceable axially and the wear take-up device including a compensating means actuated by an actuating means and arranged to effect the said displacement, said actuating means being controlled by a triggering means in association with a detection means responsive to wear in the friction liner (201) and acting on at least one of the actuating means, compensating means and triggering means, wherein the wear take-up device further includes so-called divergence means carried by one of the elements in the group consisting of the compensating means, actuating means, triggering means and detection means, adapted to modify rapidly, for a predetermined amount of wear in the friction liner (201), the position of control members for the declutching means.

2. A friction clutch according to claim 1, characterised by the fact that the divergence means are adapted to modify the position of the control members of the declutching means rapidly and before total wear of the friction liner (201) has taken place.

3. A friction clutch according to claim 1, characterised by the fact that the divergence means are adapted to modify the position of the control members of the declutching means, rapidly and for substantially the whole amount of wear in the friction liner (201).

4. A friction clutch according to claim 1, characterised by the fact the divergence means are adapted to modify the position of the control members of the declutching means abruptly and for a predetermined amount of wear.

5. A friction clutch according to claim 1, characterised by the fact that the divergence means are adapted to modify the position of the control members of the declutching means in such a way that the operation of taking up wear becomes an adjustment in a first direction following said modification.

6. A friction clutch according to claim 1, characterised by the fact that the divergence means are adapted to modify the position of the control members of the declutching means in such a way that the operation of taking up wear becomes an adjustment in a second direction following said modification.

7. A friction clutch according to claim 1, characterised by the fact that the said wear take-up device includes a set of teeth (18) with which there cooperates a worm (13) disposed tangentially, with one of the two members that consist of the ramp means (11) and counter ramp means (4) being fixed with respect to the said set of teeth (18) for rotation therewith, means (20) being provided for driving the worm (13) in rotation and being rendered operational by wear in the friction liners (201) when the clutch is engaged.

8. A friction clutch according to claim 7, characterised by the fact that the axially acting clutch engaging means (3) consist of a diaphragm.

9. A friction clutch according to claim 7, characterised by the fact that the worm (13) is mounted for displacement along its axis when subjected to the action of an elastic so-called take-up means (40), and the means (20) for driving the worm (13) in rotation consist of a ratchet wheel which is fixed with respect to the worm (13) for rotation therewith.

10. A friction clutch according to claim 8, characterised by the fact that the means (20) for driving the worm (13) in rotation are controlled through a control tongue (35), the course of travel of which with respect to the ratchet wheel (20), during the declutching operation, is limited by a so-called control abutment (36A).

11. A friction clutch according to claim 10, characterised by the fact that at least one of the fingers of the diaphragm (3) has a press-formed element (43) which is open towards the reaction plate (202).

12. A friction clutch according to claim 7, characterised by the fact that the length of the set of teeth (18) with which the worm (13) cooperates only permits the latter to take up wear in an amount corresponding to the thickness of the liners to be detected.

13. A friction clutch according to claim 12, characterised by the fact that there is provided, at the end of the set of teeth (18), a recess (30) which disengages the worm (13) from the set of teeth (18).

14. A friction clutch according to claim 1, characterised by the fact that the compensating means comprise ramp means (11, 81) which are located axially between the abutment means (14) and the pressure plate (1, 101), the said ramp means (11, 81) being adapted to cooperate with counter-ramp means (4, 105, 83).

15. A friction clutch according to claim 14, characterised by the fact that the divergence means consist of a detection ramp (41) which follows each ramp (15) of the ramp means (11), and which is inclined in the opposite direction to the ramp (15) with which it is associated.

16. A friction clutch according to claim 15, characterised by the fact that each detection ramp (41) is itself followed by a second-level ramp (42) inclined in the same direction as the so-called first-level ramp (15).

17. A friction clutch according to claim 15, in which the clutch engaging means consist of a diaphragm (3), characterised by the fact that the detection ramps (241, 341) and the second-level wear take-up ramps (242, 342) are carried by the diaphragm (3).

18. A friction clutch according to claim 17, characterised by the fact that the detecting means (241) and the second-level wear take-up ramps (242) are carried by a metallic stirrup member (44) clipped on one of the fingers of the diaphragm (3).

19. A friction clutch according to claim 17, characterised by the fact that the outer face of the head of a rivet (45) riveted on a finger of the diaphragm (3) carries the said ramps (241, 242).

20. A friction clutch according to claim 17, characterised by the fact that a finger (46) of the diaphragm (3) is press-formed so as to define the said ramps (341, 342).

21. A friction clutch according to claim 14, characterised by the fact that the ramp means (81) and the counter-ramp means (83) are urged by a spring in relative displacement in rotation in the direction of their axial spacing.

22. A friction clutch according to claim 21, in which the clutch engaging means consist of a diaphragm (103) articulated with respect to the cover plate (108) between two abutments, namely a primary abutment (110) on the same side as the cover plate and a secondary abutment (111) on the same side as the pressure plate (101) and situated in facing relationship with the primary abutment (110), the displaceable abutment being the primary abutment (110) and the triggering action being obtained by lowering of the secondary abutment (111) cooperating with an elastic detection means (120) in engagement on the cover plate (108), characterised by the fact that the divergence means consist of the diaphragm (103) and the elastic detection means (120), the load characteristics of which have been chosen accordingly.

23. A friction clutch according to claim 22, characterised by the fact that, at the end of the wear take-up phase, the load (C) of the elastic detection means (120) increases to a value ($C_3$) greater than the load ($D_2$) of the diaphragm (103).

24. A friction clutch according to claim 22, characterised by the fact that, at the end of the wear compensating phase, the load (C) of the elastic detection means (120) decreases to a value ($C_3$) smaller than the load ($D_2$) of the diaphragm (103), the course of travel of the elastic detection means (120) being limited by an end stop (122).

25. A friction clutch according to claim 21, in which the clutch engaging means consist of a diaphragm articulated with respect to the cover plate, the displaceable abutment being the pressure plate abutment, the detection means consisting of a pin extending through the pressure plate with friction and carrying an abutment (85) that cooperates with the ramp means (81) by limiting the rotation of the latter at each wear take-up operation, by virtue of a slot (86) which is defined by the ramp means (81) and in which the abutment (85) is caused to be displaced relatively, characterised by the fact that the ramps (82, 84) of the ramp means (81) and counter-ramp means (83) are separated by ramp tails (87, 88) which are inclined in the opposite direction from the latter, the ramp tails (87, 88) being caused to cooperate until the abutment (85) comes into engagement against an edge of the slot (86).

26. A friction clutch according to claim 21, in which the clutch engaging means consist of a diaphragm articulated with respect to the cover plate, the displaceable abutment being the pressure plate abutment, the detection means consisting of a pin extending through the pressure plate with friction and carrying an abutment (85) that cooperates with the ramp means (81) by limiting the rotation of the latter at each wear take-up operation, by virtue of a slot (86) which is defined by the ramp means (81) and in which the abutment (85) is caused to be displaced relatively, characterised by the fact that a recess (89) is formed in the slot (86) and is bounded by one of the edges of the slot.

27. A friction clutch according to claim 21, in which the clutch engaging means consist of a diaphragm articulated with respect to the cover plate, the displaceable abutment being the pressure plate abutment, the detection means consisting of a pin extending through the pressure plate with friction and carrying an abutment (85) that cooperates with the ramp means (81) by limiting the rotation of the latter at each wear take-up operation, by virtue of a slot (86) which is defined by the ramp means (81) and in which the abutment (85) is caused to be displaced relatively, characterised by the fact that the pin (90) extends frictionally through the pressure plate (201) by virtue of a radially elastic ring (91) fitted in a groove defined on the pin (90), the said ring (91) being arranged to leave the pressure plate (201) when the amount of wear to be detected has been reached.

* * * * *